(12) United States Patent
Wang

(10) Patent No.: US 10,259,939 B1
(45) Date of Patent: Apr. 16, 2019

(54) PEARLESCENT COMPOSITION

(71) Applicant: WELL MAX BEAUTY LAB CO., LTD., Tainan (TW)

(72) Inventor: Wei-Cheng Wang, Tainan (TW)

(73) Assignee: WELL MAX BEAUTY LAB CO., LTD., Tainan (TW)

( * ) Notice: Subject to any disclaimer, the term of this patent is extended or adjusted under 35 U.S.C. 154(b) by 29 days.

(21) Appl. No.: 15/806,520

(22) Filed: Nov. 8, 2017

(51) Int. Cl.
*C08L 67/02* (2006.01)
*B44F 9/08* (2006.01)
*B65D 1/40* (2006.01)

(52) U.S. Cl.
CPC ............. *C08L 67/02* (2013.01); *B44F 9/08* (2013.01); *B65D 1/40* (2013.01); *C08L 2205/035* (2013.01)

(58) Field of Classification Search
CPC ...... C08L 67/02; C08L 2205/035; B44F 9/08; B65D 1/40

USPC ......................................................... 523/171
See application file for complete search history.

(56) References Cited

U.S. PATENT DOCUMENTS

2016/0009016 A1* 1/2016 Wang ..................... B29C 49/06
264/537

* cited by examiner

*Primary Examiner* — Edward J Cain
(74) *Attorney, Agent, or Firm* — McClure, Qualey & Rodack, LLP

(57) ABSTRACT

A pearlescent composition for making plastic containers includes a polyester component and a pearlescent component. The pearlescent component is in an amount ranging from 1 wt % to 10 wt % based on the total weight of the pearlescent composition. The pearlescent component includes at least two materials selected from polymethylpentene, a polyolefin-based material different from polymethylpentene, a silicone rubber, and polymethylmethacrylate.

10 Claims, No Drawings

PEARLESCENT COMPOSITION

FIELD

The disclosure relates to a pearlescent composition, and more particularly to a pearlescent composition suitable for making a plastic container having a pearlescent effect.

BACKGROUND

Polyethylene terephthalate (PET) is a member of the polyester family which is tough, lightweight, and recyclable, and which has good acid/base resistance. Combined with its excellent water and moisture barrier properties, PET is widely used to make plastic containers. In order to improve the texture and increase the sales of plastic containers, a pearlescent composition is often used during the manufacturing process, providing the resulting containers with a dazzling pearlescent effect in the eyes of the viewers.

In general, conventional pearlescent compositions usually contain PET as a main component, and a pearlescent component composed of a single material other than PET. For example, US2016/0009016A1 discloses a process for making a plastic container with a pearly gloss, in which first pellets made from a single polyolefin-based material is ground into fine powders having an average particle size not greater than 500 µm (1 wt % to 10 wt %) and is blended with 90 wt % to 99 wt % of second pellets made from polyethylene terephthalate. The obtained blend is heated, followed by being subjected to injection molding to obtain a preform. The preform is then subjected to blow molding, thereby obtaining the plastic container with a pearly gloss.

Although a higher amount of pearlescent component results in a better pearlescent effect, the amount of the pearlescent component in the pearlescent composition cannot be arbitrarily increased, being required to range from 1 wt % to 10 wt % based on the total weight of the pearlescent composition. When the amount of the pearlescent component is higher than 10 wt %, phase separation between the pearlescent component and the PET component occurs due to aggregation of the pearlescent component, causing the plastic container to be flawed. In addition, the production of conventional plastic containers also involves a high-temperature heating process which consumes much energy and time. Therefore, improvements in the production of plastic containers exhibiting a better pearly gloss and reduction of the production cost are needed.

SUMMARY

Therefore, an object of the disclosure is to provide a pearlescent composition for making plastic containers with a pearlescent effect that can alleviate at least one of the drawbacks of the prior art.

According to the disclosure, the pearlescent composition includes a polyester component and a pearlescent component. The pearlescent component is in an amount ranging from 1 wt % to 10 wt % based on the total weight of the pearlescent composition. The pearlescent component includes at least two materials selected from the group consisting of polymethylpentene, a polyolefin-based material different from polymethylpentene, a silicone rubber, and polymethylmethacrylate.

DETAILED DESCRIPTION

According to this disclosure, a pearlescent composition for making plastic containers includes a polyester component and a pearlescent component. The pearlescent component is present in an amount ranging from 1 wt % to 10 wt % based on the total weight of the pearlescent composition, and includes at least two materials. The at least two materials of the pearlescent component may be selected from polymethylpentene, a polyolefin-based material different from polymethylpentene, a silicone rubber, and polymethylmethacrylate.

Examples of the non-polymethylpentene polyolefin-based material suitable for use in this disclosure include, but are not limited to, polyethylene, polypropylene, a polyolefin elastomer, an ethylene-vinyl acetate copolymer, and combinations thereof.

In certain embodiments, the polyester component includes polyethylene terephthalate (PET).

It should be noted that the amount of each of the at least two materials of the pearlescent component may vary depending on the needs of the user and implementation requirements.

According to this disclosure, the pearlescent component may include only two of the materials as mentioned above. In certain embodiments, the weight ratio of these two materials of the pearlescent component may be 1:1.

In certain embodiments, one of the two materials of the pearlescent component is a polyolefin-based material different from polymethylpentene, and the other one is selected from a silicone rubber, polymethylpentene and polymethylmethacrylate.

In certain embodiments, one of the two materials of the pearlescent component is a silicone rubber, and the other one is polymethylpentene or polymethylmethacrylate.

In certain embodiments, one of the two materials of the pearlescent component is polymethylpentene, and the other one is polymethylmethacrylate.

According to this disclosure, the pearlescent component may include three of the materials as mentioned above.

According to the disclosure, the pearlescent composition may further include a colorant. Examples of the colorant suitable for use in this disclosure include, but are not limited to, a red colorant, a blue colorant, a green colorant, an indigo colorant, a violet colorant, a yellow colorant, an orange colorant, a purple colorant, a pink colorant, a white colorant, and combinations thereof. In certain embodiments, the colorant is a red colorant.

The disclosure will be further described by way of the following examples. However, it should be understood that the following examples are solely intended for the purpose of illustration and should not be construed as limiting the disclosure in practice.

EXAMPLES

Examples 1 to 6 (EX 1 to EX 6)

Pearlescent compositions each including 0.5 wt % of a red colorant (RC), 1 wt % of a pearlescent component, and 98.5 wt % of a polyester component were prepared. The pearlescent component includes two different materials, each of which is present in 0.5 wt %. The polyester component and the two materials of the pearlescent component used in EX 1 to EX 6 are summarized in Table 1.

A respective one of the pearlescent compositions was placed into an injection molding machine, and proceeded through five consecutive heating regions which were kept at 240° C., 255° C., 265° C., 265° C., and 265° C., respectively. Thereafter, the melted pearlescent composition was injected into an injection mold to obtain a preform. The preform was disposed in a chamber equipped with a temperature adjuster until the temperature of the preform reached 90° C. The preform was then removed from the chamber, placed and held in a blow-molding mold, and subjected to blow molding. During blow molding, compressed air was blown into the preform to obtain a pearlescent plastic container.

Measurements of Color Saturation and Glossiness

The central region of the obtained pearlescent plastic container of each example was subjected to a color saturation measurement and a glossiness measurement, respectively using a spectrophotometer (model no. 600TM, Datacolor) and a BYK-Gardner microgloss meter (model no. micro-gloss 60°). The determined pearlescent effects (including color saturation and glossiness) of each example are shown in Table 1.

TABLE 1

| | | Examples | | | | | |
|---|---|---|---|---|---|---|---|
| | | EX 1 | EX 2 | EX 3 | EX 4 | EX 5 | EX 6 |
| Polyester component (wt %) | PET | 98.5 | 98.5 | 98.5 | 98.5 | 98.5 | 98.5 |
| Colorant (wt %) | RC | 0.5 | 0.5 | 0.5 | 0.5 | 0.5 | 0.5 |
| Pearlescent component (wt %) | PP | 0.5 | 0.5 | 0.5 | | | |
| | SR | 0.5 | | | 0.5 | 0.5 | |
| | TPX | | 0.5 | | 0.5 | | 0.5 |
| | PMMA | | | 0.5 | | 0.5 | 0.5 |
| Total amount (wt %) | | 100 | 100 | 100 | 100 | 100 | 100 |
| Pearlescent effects | Color saturation | 42.12 | 39.21 | 41.78 | 37.95 | 37.65 | 38.47 |
| | Glossiness | 90.45 | 87.38 | 89.15 | 86.45 | 87.22 | 85.94 |

PET: polyethylene terephthalate, purchased from Far East Textile Group (Holding) Co., Ltd.
RC: red colorant, purchased from Clariant
PP: polypropylene, purchased from Formosa Polypropylene
SR: silicone rubber, purchased from Dow Corning
TPX: commercial product MX-002 of polyemethylpentene (PMP), purchased from Mitsui Petrochemical Industries, Ltd.
PMMA: polymethylmethacrylate, purchased from Chi Mei Corporation Comparative Examples 1 to 4 (CE 1 to CE 4)

The pearlescent plastic containers of CE 1 to CE 4 were made and subjected to measurements using procedures similar to those for EX 1 to EX 6, except that the pearlescent component used in CE 1 to CE 4 only has one material, which is PP, SR, TPX or PMMA. The detailed ingredients and the determined pearlescent effects of each of CE 1 to CE 4 are shown in Table 2.

TABLE 3

| Comparative Examples | | CE 1 | CE 2 | CE 3 | CE 4 |
|---|---|---|---|---|---|
| Polyester component (wt %) | PET | 98.5 | 98.5 | 98.5 | 98.5 |
| Colorant (wt %) | RC | 0.5 | 0.5 | 0.5 | 0.5 |
| Pearlescent component (wt %) | PP | 1 | | | |
| | SR | | 1 | | |
| | TPX | | | 1 | |
| | PMMA | | | | 1 |
| Total amount (wt %) | | 100 | 100 | 100 | 100 |
| Pearlescent effects | Color saturation | 38.42 | 37.25 | 35.87 | 37.58 |
| | Glossiness | 88.24 | 86.32 | 84.39 | 85.97 |

Referring to Tables 1 and 2, by comparing EX 1 with CE 1 and CE 2, EX 2 with CE 1 and CE 3, EX 3 with CE 1 and CE 4, EX 4 with CE 2 and CE 3, EX 5 with CE 2 and CE 4, and EX 6 with CE 3 and CE 4, it can be verified that under the same amount of pearlescent component, the pearlescent plastic containers of EX 1 to EX 6, each of which use two different materials as the pearlescent component in the pearlescent composition, exhibit similar or even better glossiness, and also have better color saturation, thereby having a bright and dazzling look.

Examples 7 to 14 (EX 7 to EX 14)

The pearlescent plastic containers of EX 7 to EX 12 were made and subjected to measurements using procedures respectively similar to those for EX 1 to EX 6, except that based on the total weight of the pearlescent composition, the polyester component is in an amount of 89.5 wt %, and each of the two materials of the pearlescent component is in an amount of 5 wt %.

The pearlescent plastic containers of EX 13 to EX 14 were made and subjected to measurements using procedures similar to those for EX 7 to EX 12, except that the pearlescent component includes three different materials.

The ingredients and the determined pearlescent effects of each of EX 7 to EX 14 are shown in Table 3.

TABLE 3

| | | Examples | | | | | | | |
|---|---|---|---|---|---|---|---|---|---|
| | | EX 7 | EX 8 | EX 9 | EX 10 | EX 11 | EX 12 | EX 13 | EX 14 |
| Polyester component (wt %) | PET | 89.5 | 89.5 | 89.5 | 89.5 | 89.5 | 89.5 | 89.5 | 89.5 |
| Colorant (wt %) | RC | 0.5 | 0.5 | 0.5 | 0.5 | 0.5 | 0.5 | 0.5 | 0.5 |
| Pearlescent component (wt %) | PP | 5 | 5 | 5 | | | | 2 | 5 |
| | SR | 5 | | | 5 | 5 | | 3 | 3 |
| | TPX | | 5 | | 5 | | 5 | | |
| | PMMA | | | 5 | | 5 | 5 | 5 | 2 |
| Total amount (wt %) | | 100 | 100 | 100 | 100 | 100 | 100 | 100 | 100 |
| Pearlescent effects | Color saturation | 58.16 | 54.72 | 58.36 | 55.12 | 55.72 | 55.38 | 59.53 | 60.16 |
| | Glossiness | 105.4 | 99.5 | 104.8 | 98.3 | 101.1 | 98.2 | 105.1 | 106.4 |

Comparative Examples 5 to 8 (CE 5 to CE 8)

The pearlescent plastic containers of CE 5 to CE 8 were made and subjected to measurements using procedures similar to those for EX 7 to EX 12, except that the pearlescent component only has one material present in an amount of 10 wt %, which is PP, SR, TPX, or PMMA. The ingredients and the determined pearlescent effects of each of CE 5 to CE 8 are shown in Table 4.

TABLE 4

| Comparative Examples | | CE 5 | CE 6 | CE 7 | CE 8 |
|---|---|---|---|---|---|
| Polyester component (wt %) | PET | 89.5 | 89.5 | 89.5 | 89.5 |
| Colorant (wt %) | RC | 0.5 | 0.5 | 0.5 | 0.5 |
| Pearlescent component (wt %) | PP | 10 | | | |
| | SR | | 10 | | |
| | TPX | | | 10 | |
| | PMMA | | | | 10 |
| Total amount (wt %) | | 100 | 100 | 100 | 100 |
| Pearlescent effects | Color saturation | 51.16 | 48.31 | 42.15 | 48.25 |
| | Glossiness | 94.4 | 93.22 | 87.37 | 90.24 |

Referring to Tables 3 and 4, by comparing EX 7 with CE 5 and CE 6, EX 8 with CE 5 and CE 7, EX 9 with CE 5 and CE 8, EX 10 with CE 6 and CE 7, EX 11 with CE 6 and CE 8, and EX 12 with CE 7 and CE 8, it can be verified that due to the presence of two materials as the pearlescent component in EX 7 to EX 12, the pearlescent plastic containers of these examples exhibit better glossiness and also have better color saturation, thereby having a bright and dazzling look.

In addition, the pearlescent plastic containers of EX 13 and EX 14 using three materials as the pearlescent component have better color saturation and glossiness as compared to those of EX 7 to EX 12 using two materials as the pearlescent component.

Comparative Example 9 (CE 9)

In order to test the surface smoothness, the pearlescent plastic container of CE 9 was made and subjected to measurements using procedures similar to that for CE 5, except that the amount of polyester component was reduced to 89.3 wt %, concurrent with the addition of 0.2 wt % of wax (purchased from Clariant) as a lubricant.

In addition to color saturation and glossiness, the dynamic friction coefficient of the pearlescent plastic containers of CE 9, EX 7, EX 10 and EX 11 was further measured as follows, so as to compare the surface smoothness of CE 9, EX 7, EX 10 and EX 11. To be specific, the pearlescent plastic container of each of CE 9, EX 7, EX 10 and E11 was cut into a test piece having a size of 5 cm×4 cm, which was then subjected to a measurement for dynamic friction coefficient using a friction tester (model no. DQA101, TOYO Seiki Seisaku-Sho, Ltd.). The result is shown in Table 5.

TABLE 5

| Examples/Comparative Examples | | EX 7 | EX 10 | EX 11 | CE 9 |
|---|---|---|---|---|---|
| Polyester component (wt %) | PET | 89.5 | 89.5 | 89.5 | 89.3 |
| Colorant (wt %) | RC | 0.5 | 0.5 | 0.5 | 0.5 |
| Pearlescent component (wt %) | PP | 5 | | | 10 |
| | SR | 5 | 5 | 5 | |
| | TPX | | 5 | | |
| | PMMA | | | 5 | 1 |
| Additive (wt %) | Wax | | | | 0.2 |
| Total amount (wt %) | | 100 | 100 | 100 | 100 |
| Pearlescent effects | Color saturation | 58.16 | 55.12 | 55.72 | 51.37 |
| | Glossiness | 105.4 | 98.3 | 101.1 | 95.2 |
| Dynamic friction coefficient | | 0.31 | 0.34 | 0.32 | 0.38 |

It can be seen from Table 5 that as compared to CE 9 using wax, the pearlescent plastic containers of EX 7, EX 10, and EX 11 using SR as one of the materials of the pearlescent component have a lower dynamic friction coefficient, thereby exhibiting a smoother surface touch. Since the pearlescent plastic containers of EX 7, EX 10, and EX 11 dispense with an additional wax lubricant but still have a smoother surface touch, problems, such as incompatibility of a lubricant additive with other components of the pearlescent composition, or unacceptable product qualities, can be avoided.

It should be noted that the colorant may be omitted in other examples of the pearlescent composition, and the pearlescent composition without the colorant can still impart satisfactory glossiness to a pearlescent plastic container. The addition of a colorant to the pearlescent composition has dual effects of improving both the color saturation and glossiness of pearlescent plastic containers.

In summary, by incorporating at least two materials to form the pearlescent component, even under existing usage limitations, the pearlescent composition of this disclosure can be used to make plastic containers with improved color saturation and glossiness, as compared to conventional plastic containers prepared from a single pearlescent material. Furthermore, during the preparation of the plastic container, the pearlescent composition of this disclosure can be heated at a relatively lower temperature compared to a conventional pearlescent composition having a single pearlescent material, therefore reducing energy and time consumption, and lowering the production cost in turn.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pearlescent composition for making plastic containers, comprising:
   a polyester component; and
   a pearlescent component that is in an amount ranging from 1 wt % to 10 wt % based on the total weight of said pearlescent composition, and that includes at least two materials selected from the group consisting of polymethylpentene, a polyolefin-based material different from polymethylpentene, a silicone rubber, and polymethylmethacrylate.

2. The pearlescent composition of claim 1, wherein said pearlescent component includes two of said materials, one of said materials being a polyolefin-based material different from polymethylpentene, and the other of said materials being selected from the group consisting of a silicone rubber, polymethylpentene and polymethylmethacrylate.

3. The pearlescent composition of claim 2, wherein the weight ratio of said one and the other of said materials is 1:1.

4. The pearlescent composition of claim 1, wherein said pearlescent component includes two of said materials, one of said materials being a silicone rubber, and the other of said materials being selected from the group consisting of polymethylpentene and polymethylmethacrylate.

5. The pearlescent composition of claim 4, wherein the weight ratio of said one and the other of said materials is 1:1.

6. The pearlescent composition of claim 1, wherein said pearlescent component includes two of said materials, one of said materials being polymethylpentene, and the other of said materials being polymethylmethacrylate.

7. The pearlescent composition of claim 6, wherein the weight ratio of said one and the other of said materials is 1:1.

8. The pearlescent composition of claim 1, wherein said pearlescent component includes three of said materials.

9. The pearlescent composition of claim 1, wherein said polyester component includes polyethylene terephthalate (PET).

10. The pearlescent composition of claim 1, further comprising a colorant.

* * * * *